United States Patent
Walters et al.

(10) Patent No.: US 10,963,253 B2
(45) Date of Patent: Mar. 30, 2021

(54) VARYING MICRO-OPERATION COMPOSITION BASED ON ESTIMATED VALUE OF PREDICATE VALUE FOR PREDICATED VECTOR INSTRUCTION

(71) Applicant: Arm Limited, Cambridge (GB)

(72) Inventors: Karel Hubertus Gerardus Walters, Cambridge (GB); Chiloda Ashan Senarath Pathirane, Cambourne (GB); Michael Alexander Kennedy, Cambridge (GB)

(73) Assignee: Arm Limited, Cambridge (GB)

( * ) Notice: Subject to any disclaimer, the term of this patent is extended or adjusted under 35 U.S.C. 154(b) by 97 days.

(21) Appl. No.: 16/030,963

(22) Filed: Jul. 10, 2018

(65) Prior Publication Data
US 2020/0019402 A1 Jan. 16, 2020

(51) Int. Cl.
*G06F 15/00* (2006.01)
*G06F 9/30* (2018.01)

(52) U.S. Cl.
CPC ........ *G06F 9/3016* (2013.01); *G06F 9/30036* (2013.01)

(58) Field of Classification Search
CPC ............................ G06F 9/3016; G06F 9/30036
USPC ......................................................... 712/213
See application file for complete search history.

(56) References Cited

U.S. PATENT DOCUMENTS

| 5,487,159 | A | * | 1/1996 | Byers | G06F 9/30029 712/223 |
|---|---|---|---|---|---|
| 2007/0143575 | A1 | * | 6/2007 | Jourdan | G06F 9/325 712/2 |
| 2014/0095830 | A1 | * | 4/2014 | Plotnikov | G06F 9/30036 712/204 |
| 2015/0254077 | A1 | * | 9/2015 | Boettcher | G06F 9/30036 712/4 |
| 2016/0041827 | A1 | * | 2/2016 | Corbal | G06F 9/30018 712/5 |
| 2017/0017487 | A1 | * | 1/2017 | Plotnikov | G06F 9/30036 |
| 2018/0246722 | A1 | * | 8/2018 | Plotnikov | G06F 9/30032 |

* cited by examiner

*Primary Examiner* — Chun Kuan Lee
(74) *Attorney, Agent, or Firm* — Nixon & Vanderhye P.C.

(57) ABSTRACT

An apparatus comprises instruction decoding circuitry to generate micro-operations in response to program instructions; and processing circuitry to perform data processing in response to the micro-operations generated by the instruction decoding circuitry. In response to a predicated vector instruction, the instruction decoding circuitry reads or predicts an estimated value of the predicate value, and depending on the estimated value, varies a composition of at least one micro-operation generated in response to the predicated vector instruction. This can enable more efficient use of hardware resources in the processing circuitry.

17 Claims, 5 Drawing Sheets

VARYING MICRO-OPERATION COMPOSITION BASED ON ESTIMATED VALUE OF PREDICATE VALUE FOR PREDICATED VECTOR INSTRUCTION

BACKGROUND

Technical Field

The present technique relates to the field of data processing. More particularly, it relates to vector processing.

Technical Background

Some data processing systems may support processing of vector instructions which control processing circuitry to perform a vector processing operation on at least one vector operand comprising a number of distinct data elements to generate a result value. For some types of vector instruction, the result value may be a result vector comprising multiple data elements. For other types of vector instruction, the result value may be a scalar value). By supporting the processing of a number of distinct data elements in response to a single vector instruction, code density can be improved and the overhead of fetching and decoding of instructions reduced compared to performing equivalent operations using scalar instructions which can only process a single data value at a time. An array of data values to be processed can therefore be processed more efficiently by loading the data values into respective elements of a vector operand and processing the data values several elements at a time using a single vector instruction.

SUMMARY

At least some examples provide an apparatus comprising: instruction decoding circuitry to generate micro-operations in response to program instructions; and processing circuitry to perform data processing in response to the micro-operations generated by the instruction decoding circuitry; in which: in response to a predicated vector instruction specifying at least one vector operand and a predicate value, the instruction decoding circuitry is configured to generate at least one micro-operation to control the processing circuitry to perform a vector processing operation on the at least one vector operand to generate a result value, the predicate value specifying which of a plurality of data elements of each vector operand are active data elements, where the result value is dependent on the active data elements of said at least one vector operand; and in response to the predicated vector instruction, the instruction decoding circuitry is configured to read or predict an estimated value of the predicate value, and depending on said estimated value, to vary a composition of said at least one micro-operation generated in response to the predicated vector instruction.

At least some examples provide an apparatus comprising: means for generating micro-operations in response to program instructions; and means for performing data processing in response to the micro-operations generated by the means for generating; in which: in response to a predicated vector instruction specifying at least one vector operand and a predicate value, the means for generating is configured to generate at least one micro-operation to control the means for performing data processing to perform a vector processing operation on the at least one vector operand to generate a result value, the predicate value specifying which of a plurality of data elements of each vector operand are active data elements, where the result value is dependent on the active data elements of said at least one vector operand; and in response to the predicated vector instruction, the means for generating is configured to read or predict an estimated value of the predicate value, and depending on said estimated value, to vary a composition of said at least one micro-operation generated in response to the predicated vector instruction.

At least some examples provide a data processing method comprising: a decoding step of generating micro-operations in response to program instructions; and a processing step of performing data processing in response to the micro-operations generated in the decoding step; in which: the decoding step comprises, in response to a predicated vector instruction specifying at least one vector operand and a predicate value: reading or predicting an estimated value of the predicate value; and generating at least one micro-operation to control the processing step to perform a vector processing operation on the at least one vector operand to generate a result value, the predicate value specifying which of a plurality of data elements of each vector operand are active data elements, where the result value is dependent on the active data elements of said at least one vector operand, and a composition of said at least one micro-operation is varied depending on said estimated value of the predicate value.

Further aspects, features and advantages of the present technique will be apparent from the following description of examples, which is to be read in conjunction with the accompanying drawings.

DESCRIPTION OF EXAMPLES

Figure 1:
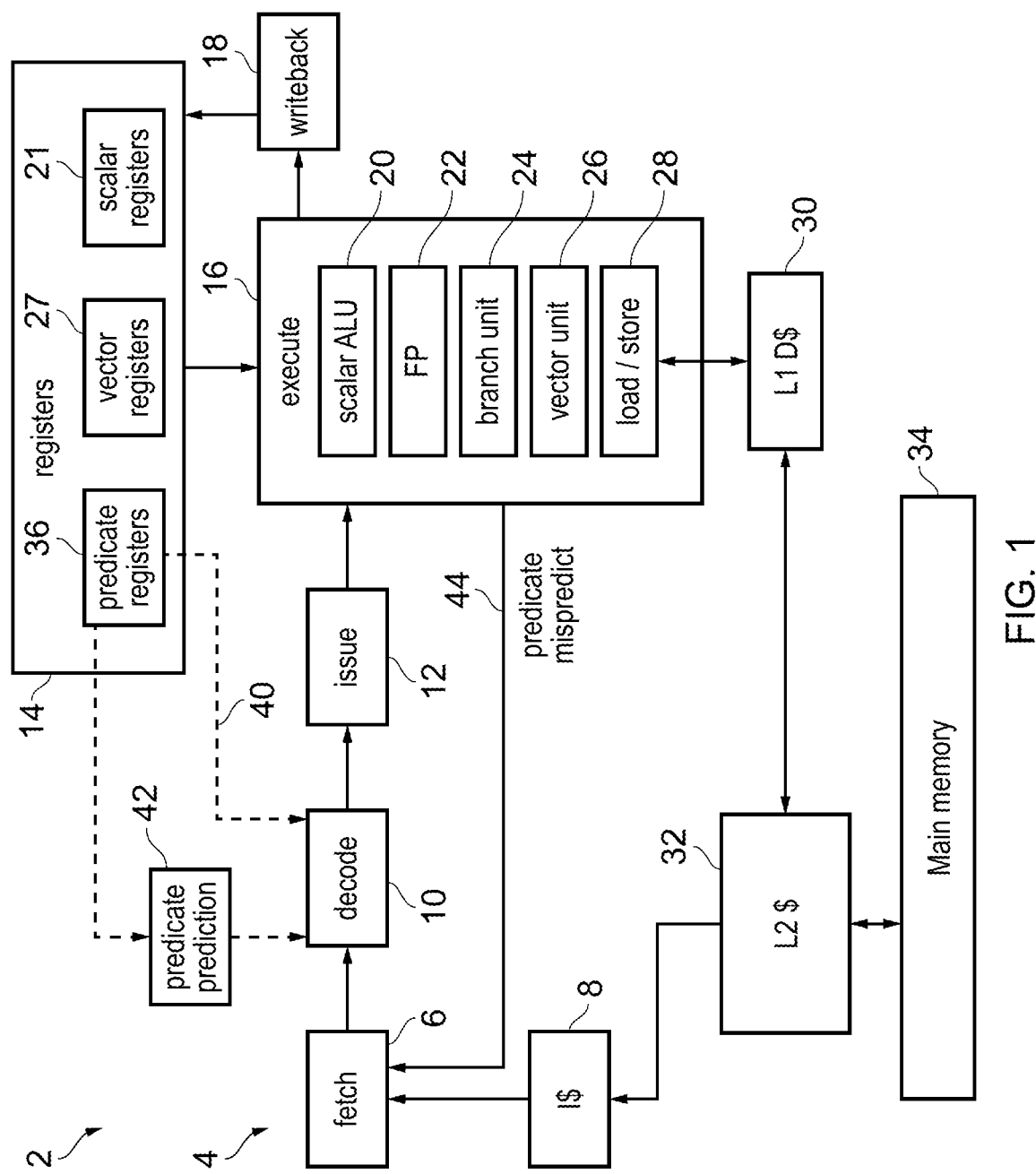
FIG. 1 schematically illustrates an example of an apparatus supporting vector processing.

Some systems may support predicated vector instructions, for which a vector operation is controlled by a predicate value which identifies which data elements of each vector operand are active data elements. In response to a predicated vector instruction, a result value is generated which depends on the active data elements of at least one vector operand, and is independent of any inactive data elements. Predication can be useful for example for masking out certain lanes of vector processing depending on conditional operations performed earlier, so that some operations may only be applied to elements which correspond to lanes in which the required condition was satisfied. Predication can also be useful in a vector loop to mask out a tail of vector elements which extend beyond the end of the array of data to be processed in the loop, when the number of elements to be processed is not an exact multiple of the vector length. In some systems, only selected types of vector instructions may be predicated, while in other systems substantially all vector instructions may be predicated. The result value could be a scalar value, where the scalar depends on a function of the active data elements of the at least one vector operand. For other types of predicated vector instruction, the result value could be a result vector, where the predicate value also indicates which elements of the result vector are active or inactive. For instructions generating a result vector, any inactive elements of the result vector could for example be set to a predetermined value such as 0, or could be set to values corresponding to the previous contents of the corresponding elements of the result register, to merge newly calculated values for the active data elements with previous values of the inactive elements in the result vector.

Typically, when processing a predicated vector instruction, instruction decoding circuitry may map the predicated vector instruction to a fixed group of one or more micro-operations selected based on the specific type of predicated vector instruction. The generated micro-operations may then progress down the pipeline and when they reach the execute stage of the processing circuitry, the predicate value associated with the instruction may be read, to control which portions of the vector processing hardware are needed to process the active data elements to generate the result value. If some lanes of vector processing are determined based on the predicate to correspond to inactive elements, then corresponding portions of the hardware could be placed in a power saving state (e.g. using power gating or clock gating), to save energy.

However, the inventors recognised that for some vectorised processing algorithms it may be relatively common for the predicate value to be sparsely set so that there are relatively few active data elements and a larger number of inactive elements. Generating a fixed composition of micro-operations for a given predicate vector instruction, independently of the predicate value, may result in micro-operations being sent to the processing circuitry which then result in significant portions of the data processing resources corresponding to inactive elements, which can result in inefficient usage of the processing hardware available.

In the technique discussed below, instruction decoding circuitry generates micro-operations in response to program instructions for controlling the processing circuitry to perform corresponding data processing. In response to a predicated vector instruction, the instruction decoder may read or predict an estimated value of the predicate value and, depending on the estimated value, may vary a composition of the at least one micro-operation which is generated in response to the predicated vector instruction. Hence, rather than deferring reading of the predicates until the execute stage, the predicate value could be checked at the decode stage or could be predicted by the decode stage so that an estimation can be determined of how densely populated the predicate is with active elements. The decode stage can then use this information about the estimated predicate value to generate a composition of micro-operations which may make more efficient use of the processing hardware available at the execute stage. By enabling the composition of micro-operations to vary depending on the estimated value of the predicate value this can increase opportunities for power savings and/or increase performance by enabling a greater fraction of the available hardware resources to be used in response to each micro-operation.

In some examples, the processing pipeline may have a dedicated decoding stage for decoding program instructions to generate micro-operations and the instruction decoding circuitry may correspond to that decode stage. Alternatively in some pipelines there may be several different stages of the pipeline at which operations to be performed are remapped to a different composition of micro-operations. For example the instruction decoding circuitry could initially decode program instructions fetched from memory or an instruction cache into micro-operations, but then at a later stage, such as an issue stage, there could be a further adjustment of the micro-operations. For example, the issue stage could fuse two micro-operations together to generate a compound micro-operation supported by the processing circuitry, or split a single micro-operation into multiple separate micro-operations to be processed independently by the processing circuitry. Providing the ability to further vary the micro-operation composition at a later stage than the decode stage could enable other factors (such as the availability of operands) to be considered in determining the most efficient form in which to execute the required operations. Hence, the "instruction decoding circuitry" can include not only the instruction decoder itself but also any other stages of the pipeline that are able to vary the composition of micro-operations sent to the execute stage of the pipeline.

The estimated value of the predicate value could be obtained in different ways by the instruction decoding circuitry. In one example the instruction decoding circuitry may simply read the estimated value of the predicate value from a predicate register specified by the predicated vector instruction. The read predicate value may be considered an estimate of the value of the predicate at the time the micro-operations are executed (as in some cases it may be possible that an outstanding micro-operation could still change the predicate value before the micro-operations corresponding to the predicated vector instruction reach the execute stage at which the real predicate value would normally be read). The instruction decoding circuitry could read the estimated value of the predicate value from the predicate register at the time the predicated vector instruction is decoded, on the assumption that the predicate value will not change by the time that the corresponding micro-operations are executed.

Alternatively, another approach may be that the instruction decoding circuitry may predict the estimated value of the predicate value based on an actual value of the predicate value identified by the processing circuitry on a previous instance of processing the predicated vector instruction. For example, a prediction store may be maintained which the predicate value that was encountered before for predicated vector instructions at particular instruction addresses. For example, in a program loop, it may be relatively common that the predicate value stays constant across multiple iterations of the loop, and so each time a given instruction address is reached it may be predicted that the predicate value will be the same as a previous iteration of the loop. This approach avoids needing to actually read the predicate registers at the decode stage.

Regardless of whether the estimated predicate value used for varying the micro-operation composition is the actual value of the predicate read from the predicate register or is a predicted value derived from the outcome of previous instances of execution, the term estimated value of the predicate value is used herein to refer to both of these options.

There may be a number of different ways in which the composition of the at least one micro-operation generated for the predicated vector instruction could be varied based on the estimated value of the predicate value. In one example, a vector size specified for the at least one micro-operation could be varied depending on the estimated value of the predicate value. For example if the estimated value of the predicated value indicates that the predicate is relatively sparsely populated with active elements then this may allow the required operations to be performed using a smaller vector size. By reducing the vector size when possible, this could allow more efficient use of the available hardware resources. For example the micro-operations for the predicated vector instruction could be scheduled for execution on a narrower vector execution unit which could in some cases enable other portions of the hardware to be reused for other instructions. This could help to improve the number of instructions which can be processed per processing cycle. In one example, when the estimated value of the predicate value indicates that less than a threshold number or fraction of the data elements in one vector operand are active data elements, then the instruction decoding circuitry may generate the at least one micro-operation specifying a smaller vector size for the vector processing operation than a vector size specified for the predicated vector instruction.

In another example, the instruction decoding circuitry may vary how many micro-operations are generated in response to the predicated vector instruction, depending on the estimated value of the predicate value. In some microarchitectural implementations, the processing hardware for processing vector instructions may be narrower than the maximum vector size supported in the architecture. For example, while program instructions could specify vectors of some larger size such as 512 or 1024 bits, the processing hardware could be limited to processing 256-bit vectors at a time, and so if a program instruction requires a vector size greater than 256-bits then this may be processed through multiple passes of the hardware, which may be controlled by generating multiple micro-operations, each micro-operation corresponding to a subset of the elements of the vector specified by the program instruction. If the predicate value is relatively sparsely populated, then this may allow the number of micro-operations generated for the predicated vector instruction to be reduced, as the active elements could be mapped to a smaller number of micro-operations. Hence, by considering the estimated value of the predicate value this can avoid unnecessarily generating the full number of micro-operations that would be required if all of the elements were active, to improve performance by allowing other micro-operations to be processed faster.

Another option may be that the instruction decoding circuitry may determine whether to fuse multiple predicated vector instructions to generate at least one combined micro-operation for processing by the processing circuitry, depending on estimated values of the predicate value for each of the multiple predicated vector instructions. For example, if there are a number of predicated vector instructions each corresponding to the same type of processing operation (e.g. each instructing an add operation) and the predicate values for those instructions are such that all the active elements for each of the predicated vector instructions could be mapped to a single vector that can be processed by a single combined micro-operation, then these instructions can be fused. This allows greater utilisation of processing hardware, as the operations of the multiple instructions can be performed in parallel to increase the number of instructions processed per cycle, freeing up resource in other cycles for handling other instructions. For example, the instruction decoding circuitry may determine whether to fuse the predicated vector instructions depending on a determination of whether a total data size of the active elements indicated by the estimated values of the predicate value for each of the two or more predicated vector instructions is less than a maximum vector size supported by the processing circuitry. In contrast, if each predicated vector instruction was separately mapped to some fixed composition of micro-operations regardless of its predicate, this could result in a number of distinct steps of micro-operations being passed down the pipeline to the execute stage, which would each be executed separately and would not fully utilise the available processor hardware. Performance can be improved by fusing the sets of micro-operations into a combined set of micro-operations when the predicates are sparse enough to permit fusion into fewer micro-operations.

In another option, when the estimated value of the predicate value includes a number of active elements at non-adjacent element positions, the instruction decoding circuitry could generate at least one remapped micro-operation for which portions of the at least one vector operand corresponding to the active elements are remapped to adjacent element positions. For example the predicate can be collapsed so that the locations of the active elements are mapped to a contiguous portion of the vector. This can often result in significant fractions of the vector becoming inactive. It may generally be more efficient to apply energy saving techniques (such as power of clock gating) to sections of the processing hardware which correspond to a contiguous portion of the vector, rather than individual elements at non-adjacent positions, and so by remapping the positions of the active elements depending on the estimated value of the predicate value this can enable greater opportunities for power savings. Also, as discussed above, if the active elements are mapped to adjacent element positions, then this may also enable issuing of micro-operations with a reduced vector size or may enable issuing of a smaller number of micro-operations.

For predicated vector instructions where the result value is a result vector, when such remapping of element positions is performed, the result elements generated by the processing circuitry may be generated in parts of the hardware corresponding to adjacent lanes of processing, but when those results are written to a result vector register they may need to be mapped back to the non-adjacent element positions within the vector register, to ensure that the correct correspondence between the original inputs and the output elements is maintained. Hence, when the instruction decoding circuitry generates at least one remapped micro-operation, the processing circuitry may write adjacent portions of the result vector generated by the processing circuitry to non-adjacent portions of at least one result vector register. These non-adjacent portions may be selected depending on the predicate value (e.g. the actual value of the predicate value which may be read from a predicate register at the execute stage).

While the instruction decoding circuitry may have the capability to vary the composition of the at least one micro-operation generated for a given predicated vector instruction, it need not always do so. Sometimes, some events may occur which may mean it is better to simply issue some fixed composition as a default for the micro-operations generated in response to the predicated vector instruction.

For example, as discussed above it is possible that when the predicated vector instruction is encountered at the decode stage, there may be an outstanding instruction or micro-operation pending which has not been executed yet which could change the predicate value for the predicated vector instruction before the at least one micro-operation generated from the predicated vector instruction would be processed by the processing circuitry. Hence, reading the predicate register at the decode stage could lead to incorrect operations if this value then subsequently changes, but the micro-operation composition has been generated based on the out of date predicated value. This scenario could be handled in different ways.

In one example, the instruction decoding circuitry may check, when encountering a predicated vector instruction to be decoded, whether there is any outstanding micro-operation which is capable of changing the predicated value for the predicated vector instruction before the at least one micro-operation which would be generated in response to the predicated vector instruction is processed by the processing circuitry. For example, the instruction decoding circuitry could maintain a counter which tracks how many predicate setting micro-operations it has issued and which is decremented when a predicate setting micro-operation is executed or committed (written back). In some case, two or more counters could separately track setting of individual predicate registers, or alternatively a single counter could simply track the total number of outstanding predicate setting micro-operations regardless of which predicate register is actually set by the micro-operations. Hence, when it is determined that there is no outstanding micro-operation capable of changing the predicate value remaining, the instruction decoding circuitry could vary the composition of the micro-operations generated from the predicated vector instruction based on the estimated value of the predicate value, as it may be known that this value cannot change before those micro-operations are executed. However, when there is at least one outstanding micro-operation deemed capable of changing the predicate (which could in some cases be any outstanding predicate setting micro-operation regardless of which predicate register is specified by that micro-operation, if the tracking of outstanding micro-operations is less precise), then the instruction decoding circuitry may generate the at least one micro-operation with a fixed (default) composition independent of the estimated value of the predicates value. Note that this fixed composition is fixed for a given type of predicated vector instruction, but could be different for one type of predicated vector instruction relative to another. For example the fixed composition for a predicated add instruction could be different to a fixed composition for a predicated multiply instruction. For example, the fixed composition could be a composition of micro-operations would enable the correct operations to be performed even if, when the predicate is read at the execute stage, it turns out all the elements are active.

Alternatively, even though the predicate value could change after the estimate has been obtained (either by a prediction or by an actual read to the register file), some implementations may still allow the composition of micro-operations generated for a predicated vector instruction to vary regardless of whether there is any outstanding predicate setting instruction. However, when the micro-operations generated from the predicated vector instruction are executed, the processing circuitry may determine whether an actual value of the predicate value at that time matches the estimated value determined by the instruction decoding circuitry when the corresponding micro-operations were generated. If there is a mismatch between the actual value and the estimated value of the predicate value, then a misprediction recovery action could be triggered. For example the misprediction recovery action could comprise restoring architectural state associated with a previous processing point and resuming processing from that previous processing point. For example, a similar misprediction recovery mechanism used for recovering from branch mispredictions or other forms of misspeculation could be used. Hence, with this approach it is not necessary to consider at the decode stage whether there are still any outstanding predicate setting instructions, as any incorrect estimate of the predicate can be resolved by replaying the instructions. In most cases, predicate setting instructions may be relatively rare, so the penalty of an occasional incorrect estimate may be outweighed by the performance gains in using the hardware resource more efficiently in the more common case when there is no change of predicate.

FIG. 1 illustrates an example of a data processing apparatus 2 supporting vector processing. The data processing apparatus has a processing pipeline 4 which includes a number of pipeline stages. In this example, the pipeline stages include a fetch stage 6 for fetching instructions from an instruction cache 8; a decode stage 10 for decoding the fetch program instructions to generate micro-operations to be processed by remaining stages of the pipeline; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages. For example in an out-of-order processor an additional register renaming stage could be included for mapping architectural registers specified by program instructions or micro-operations to physical register specifiers identifying physical registers in the register file 14.

The execute stage 16 includes a number of processing units, for executing different classes of processing operation. For example the execution units may include a scalar arithmetic/logic unit (ALU) 20 for performing arithmetic or logical operations on scalar operands read from a scalar register file 21; a floating point unit 22 for performing operations on floating-point values, a branch unit 24 for evaluating the outcome of branch operations and adjusting the program counter which represents the current point of execution accordingly; a vector processing unit 26 for performing vector data processing on vector operands in vector register file 27; and a load/store unit 28 for performing load/store operations to access data in a memory system 8, 30, 32, 34. In this example the memory system include a level one data cache 30, the level one instruction cache 8, a shared level two cache 32 and main system memory 34. It will be appreciated that this is just one example of a possible memory hierarchy and other arrangements of caches can be provided. The specific types of processing unit 20 to 28 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline architecture, and the processor may include many other elements not illustrated for conciseness, such as branch prediction mechanisms or address translation or memory management mechanisms.

Figure 2:
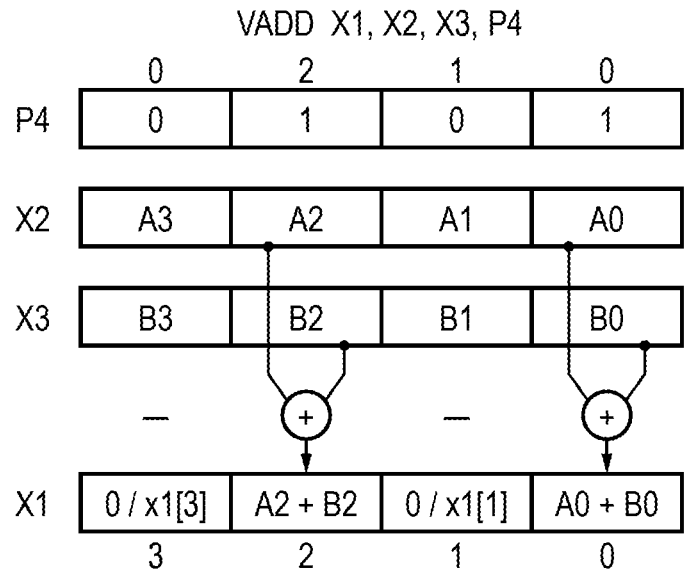
FIG. 2 illustrates an example of a predicated vector instruction.

FIG. 2 shows an example of a predicated vector operation which may be supported by the vector processing unit 26 of the execute stage 16. A predicated vector instruction (in this example an add instruction VADD) may specify a result vector register X1, two operand vector registers X2 and X3 and a predicate register P4 from a predicate register file 36. The predicate register file 36 may include one or more registers for storing predicate values which indicate which elements of a corresponding vector should be regarded as active elements. Predicate setting instructions included in the executed program code may be used to set or clear respective bits of the predicate value to indicate which elements are active. When the vector processing unit 26 executes operations corresponding to a predicated vector instruction, the results corresponding to the active elements are written to the result vector register, while elements of the result vector register which correspond to inactive elements are either cleared to a predetermined value such as 0 or may retain their previous value.

For example, in FIG. 2 the predicate value in predicate register P4 has active elements indicated at element positions 0 and 2, and inactive elements indicated at element positions 1 and 3. Hence, elements 0 and 2 of the result vector register X1 are set to the sum of the corresponding elements in the source operand registers X2, X3, while the inactive elements 1 and 3 of the result vector X1 are cleared to 0 or retain their previous values so as to merge the newly calculated active elements with the previous contents of the result register.

FIG. 2 shows one example of a possible predicated vector instruction and it will be appreciated that many other forms of predicated instruction are possible. It is not essential for all predicated vector instructions to have two input operands, as some forms of instructions could act on a single operand. It is also not essential for the number of data elements in the result vector to be the same as the number of vector elements in the input operands. For example some forms of vector instruction could include an element widening or contracting operation which may change the size of elements. Also it is not essential for each of the elements to be the same width, as some systems may support elements of different sizes within the same vector.

Also, some forms of predicated vector instruction may generate a scalar result value, instead of a vector result value. For example, a vector instruction could add together the active data elements of an operand vector, and write the scalar result representing the sum of the active data elements to a scalar result register.

While the instruction set architecture supported by the processing pipeline 4 of FIG. 1 may specify a predicated vector instruction of the form shown in FIG. 2, there may be considerable flexibility in how this instruction is implemented in the pipeline microarchitecture, so that different system designers may choose different options for implementing the same architectural instruction. For example, some microarchitectures may execute the different lanes of processing performed on each element of the vector in parallel using multiple hardware units or configurable portions of a shared hardware unit, so that each of the vector elements can be processed in the same cycle to generate the corresponding result elements. However other microarchitectures may support architectural instructions with a greater vector size than the maximum size supported by the microarchitecture in hardware, and in this case the vector instruction could be mapped to multiple separate micro-operations which are processed in separate passes through narrower processing hardware.

The decode stage 10 may be responsible for decoding the architectural program instructions fetched from the instruction cache 8 and mapping these to micro-operations which represent the particular control signals for controlling processing units implemented in the microarchitecture to perform the required data processing operations. In a conventional system, for a predicated vector instruction of the type shown in FIG. 2, the composition of micro-operations generated in response to the predicated vector instruction would not depend on the current value of the predicate. Instead the predicate value would simply be read from the predicate register 36 at the execute stage 16 and then any inactive lanes could be power gated or clock gated to reduce power consumption.

However, the inventors have recognised that a significant fraction of the predicate value may indicate inactive elements for some vectorised processing algorithms, so waiting until the execute stage 16 to find that large chunks of the vector are inactive may result in inefficient usage of the available hardware resource.

Hence, the decode stage 10 may make an estimate of the predicate value required for a given predicated vector instruction, and may vary the composition of the micro-operations sent to downstream pipeline stages based on the estimated value of the predicate. As shown in FIG. 1, two alternative approaches may be used for obtaining this estimate. In one approach indicated by line 40 the current value of the required predicate register may be read from the predicate register 36 itself by the decode stage 10, and then the decode stage 10 could vary the composition of micro-operations based on the read predicate register. Alternatively, a predicate prediction store 42 can be maintained which tracks the actual value of the predicate register which was encountered at the execute stage 16 on previous instances of execution of a predicated vector instruction at a given instruction address, and then the decode stage 10 may predict the estimated value of the predicate based on the previously encountered predicate values for the same instruction. At the execute stage 16, the vector unit 26 could then compare the actual predicate value in the required predicate register 36 with the predicted value obtained by the decode stage 10 and if there is a mismatch then a predicate misprediction signal 44 could be issued to the fetch stage 6 to trigger the fetch stage to halt fetching and rewind processing to some earlier point before the predicate prediction was made. Previous architectural state may be restored to the registers 14 to allow processing to resume with the correct value of the predicate. This misprediction recovery may be similar to the actions taken if a branch misprediction is detected.

Figure 3:
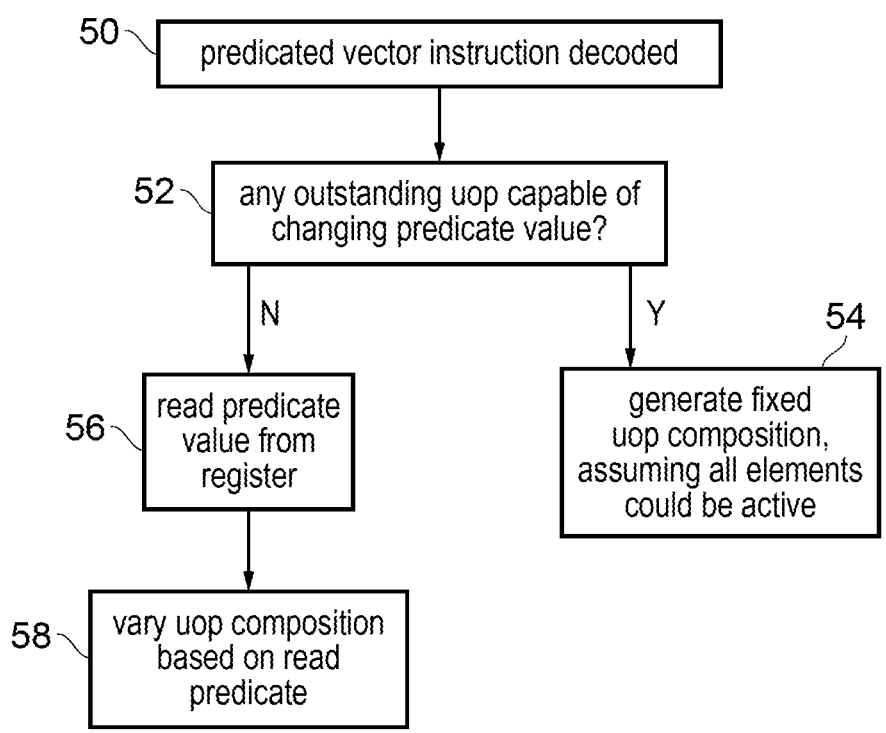
FIGS. 3 and 4 are flow charts illustrating example methods of varying micro-operation composition for a predicated vector instruction based on an estimated value of the predicate value.
Figure 4:
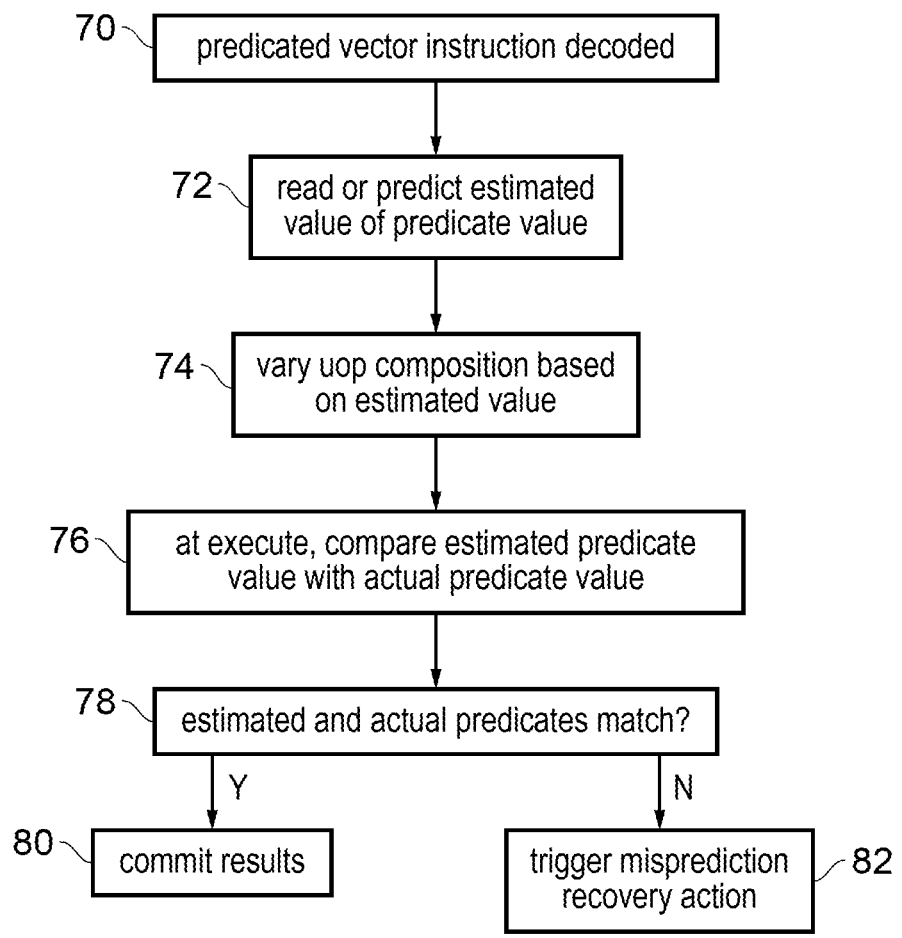

FIGS. 3 and 4 are flow diagrams illustrating methods of generating micro-operations for a predicated vector instruction based on these alternative techniques. FIG. 3 shows an approach where the actual predicate value is read from the predicate register 36 by the decode stage 10. At step 50 the instruction decode stage 10 decodes a predicated vector instruction. At step 52 the decode stage 10 identifies whether there is any outstanding micro-operation pending which could be capable of changing the predicate value. An "outstanding" micro-operation may be a micro-operation which has been generated and passed downstream by the decode stage 10 but has not yet reached the write back stage 18. For example the decoder 10 may contain a counter which tracks how many predicate setting micro-operations it has generated and the write back stage 18 may decrement the counter when it writes a value to the predicate registers 36 in response to one of such micro-operations. In some cases, any outstanding predicate setting micro-operation may be considered capable of changing the predicate value specified by the instruction being decoded, even if the outstanding micro-operation actually specifies a different predicate register to the instruction. This is because to reduce circuit overhead the micro-architecture may not track outstanding predicate setting operations separately for each predicate register. If there is at least one outstanding micro-operation which could set the predicate value to a different value then at step 54 the decode stage 10 generates a fixed composition of micro-operations (which is a default composition of micro-operations specified for the particular type of instruction being decoded, e.g. the same composition that would have been generated had the predicate not been considered at all). This fixed micro-operation composition may be fixed for a given type of instruction but could still be different to the fixed composition selected if other types of predicated vector instruction are encountered. For example the fixed composition could be the maximum number of micro-operations which can be generated for this type of predicated vector instruction or may specify the same vector length specified by the predicated vector instruction.

On the other hand, if there are no outstanding micro-operations capable of changing the predicate value before the operations corresponding to the current predicated vector instruction would be executed, then at step 56 the instruction decoder 10 reads the predicate value from the predicate register 36 specified by the instruction, and at step 58 the composition of micro-operations generated for the predicated vector instruction is varied based on the read estimate of the predicate value. Different options for this variation in micro-operation composition are described below.

FIG. 4 is a flow diagram showing an alternative approach where mispredictions or a change in the predicate value between the decode and execute stages can be detected at the execute stage and a misprediction recovery action triggered if necessary. This approach could be applied either to the case where the decode stage actually reads the predicate register 36, or where a prediction of the predicate is made without a register read based on the predicate prediction store 42.

At step 70 of FIG. 4, a predicated vector instruction is decoded by the decode stage 10. At step 72 the decode stage 10 reads or predicts the estimated value of the predicate value, and at step 74 the decode stage 10 varies the micro-operation composition for the predicated vector instruction based on the estimated value of the predicate. Hence in this example there is no need to track whether there is any outstanding micro-operation which could still change the predicate value.

At step 76, when the micro-operations corresponding to the predicated vector instruction reach the execute stage 16, the execute stage compares the estimated predicate value obtained by the decode stage 10 with the actual predicate value which is currently stored in the predicate register 36 specified by the predicated vector instruction. At step 78 the execute stage 16 determines whether the estimated and actual predicate values match, and if so, results of the generated micro-operations are committed and written back to the registers by the write back stage 18 at step 80. If there is a mismatch between the estimated predicate value assumed by the decode stage 10 and the actual predicate checked at the execute stage 16, then at step 82 a misprediction recovery action is triggered, for example to rewind processing to an earlier point of the program code which preceded the mispredicted predicated vector instruction.

Figure 5:
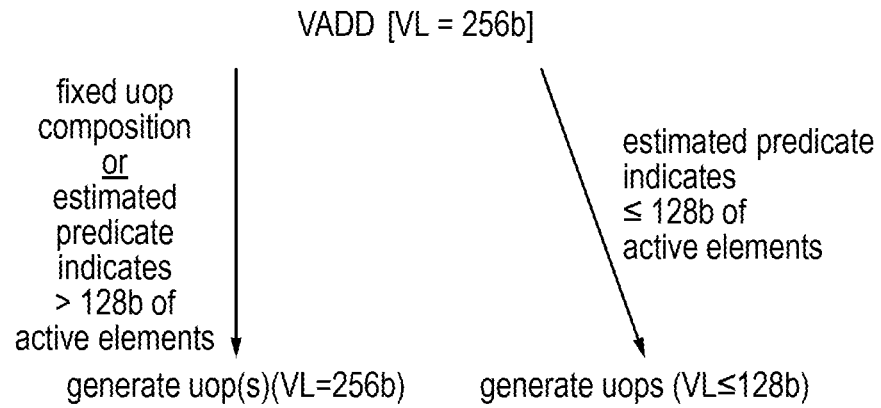
FIGS. 5 to 7 illustrate different examples of varying the micro-operation composition.

FIG. 5 shows a first example of varying the composition of the micro-operations at step 58 or 74 of FIGS. 3 and 4. In this example, the fetched vector add instruction specifies a vector length of a certain size, for example 256 bits. If the fixed micro-operation composition is required as at step 54 of FIG. 3, or if the estimated predicate value is obtained and it indicates that there will be more than a 128 bits of active elements to process, then a micro-operation composition can be generated according to the full vector size of 256 bits specified by the program instruction. However, if the estimated predicate value indicates that the total size of the active elements is less than a threshold (e.g. 128 bits in this example), then the vector add instruction can be mapped to a composition of micro-operations which operate on a vector size of 128 bits or less. For example, this may allow fewer micro-operations to be generated, or allow a micro-operation to be processed on a reduced part of the processing hardware which may improve energy efficiency and/or performance.

Figure 6:
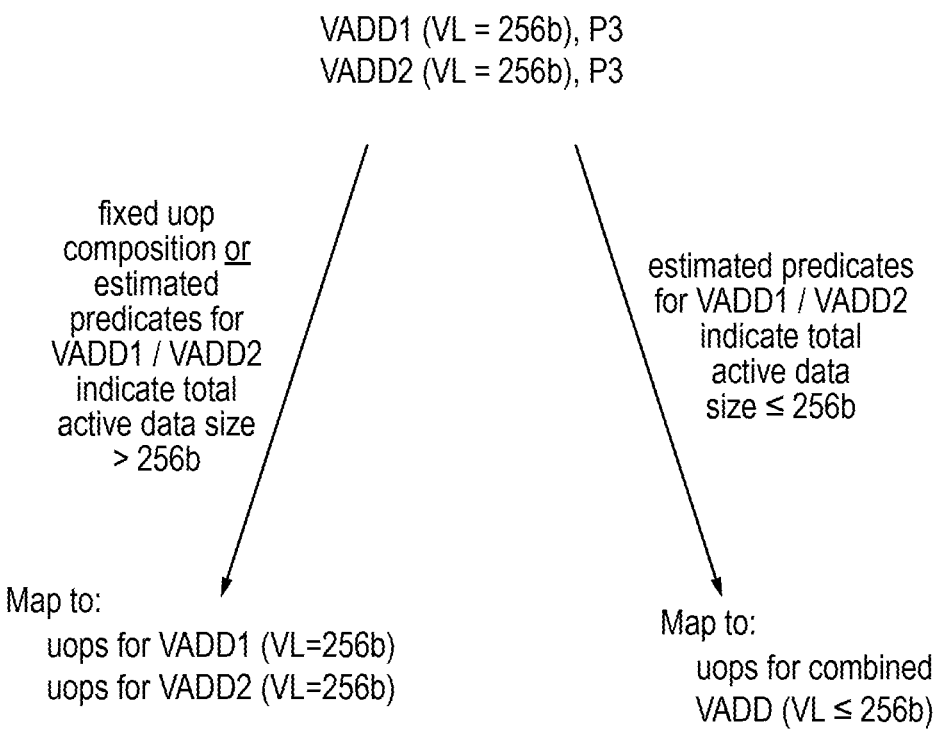

FIG. 6 shows an example of fusing multiple program instructions into a combined set of micro-operations based on the estimated predicate values. This examples shows two separate add instructions VADD1 and VADD2 which both specify a vector length of 256 bits and use the same predicate value P3 (although it is not essential for the same predicate register to be specified by the instructions to be fused, it may be more likely that vector instructions from multiple loop iterations would specify the same predicate register and can be fused together if the loop operates on a sparsely populated vector). The estimated values of the predicates for the predicate registers of each instruction can be checked, and if they indicate a total active data size for the two instructions of greater than 256 bits then the two instructions may each be mapped to a separate set of micro-operations in the same way as if the fixed micro-operation composition for each instruction was used. On the other hand, if the predicate for each of the instructions indicate that the total size of the active data elements for each of the instructions is less than or equal to 256 bits, then the two instructions could be fused into a combined set of micro-operations which correspond to a vector length of 256 bits or less. It will be appreciated that the threshold size of 256 bits is just one example—more generally a comparison of the size of the active data elements with some threshold (or multiple thresholds corresponding to different supported vector sizes) may be performed.

Figure 7:
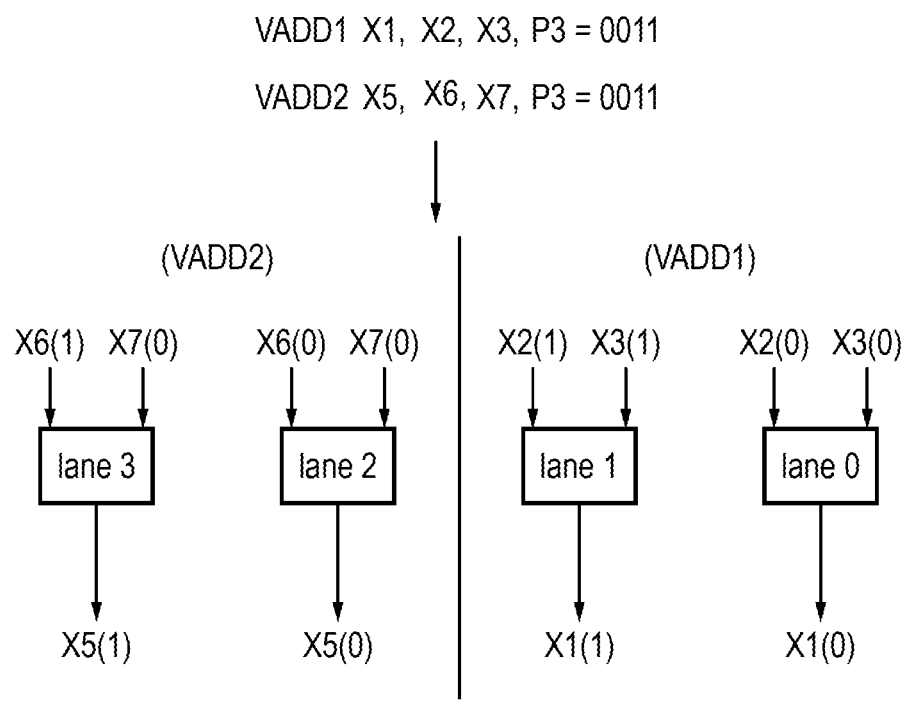

As shown in FIG. 7, by fusing multiple program instructions into a combined set of micro-operations, this can enable the operations corresponding to the respective program instructions to be performed in parallel on different portions of the processing hardware. For example FIG. 7 shows a case where there are four elements per vector, and the predicates indicate that only half of the elements are active for each of the two vector add instructions. The two active elements for VADD1 are processed on lanes 0 and 1 of the processing hardware and the two active elements for VADD2 can be processed on lanes 2 and 3 of the processing hardware. The execute stage 16 may have result mapping circuitry which takes the results of each lane and writes the results into the required portions of the different vector registers specified by the original program instructions. For example the results of lane 0 and 1 can be written to elements 0 and 1 of vector register X1 while the results of lanes 2 and 3 can be written to elements 0 and 1 of vector register X5, under control of the predicate values P3 for the respective instructions. Similarly the execute stage 16 may ensure that the inputs for each lane are read from the correct element positions of each source register. This could be done in different ways. In systems supporting register renaming, the remapping of which portions of the register are referenced by each lane could be done through remapping architectural registers to physical registers, while in other examples then some multiplexing circuitry may be provided to select out the different values.

Hence, by considering the predicate values at the decode stage 10 this allows the hardware to be utilised more fully and allows multiple instructions to be processed in parallel increasing performance. In contrast, if each predicated vector instruction was simply mapped to a fixed set of micro-operations regardless of the value of its predicate then some of the lanes of the processing hardware may be unutilised and it may take more cycles to perform the equivalent operations.

Figure 8:
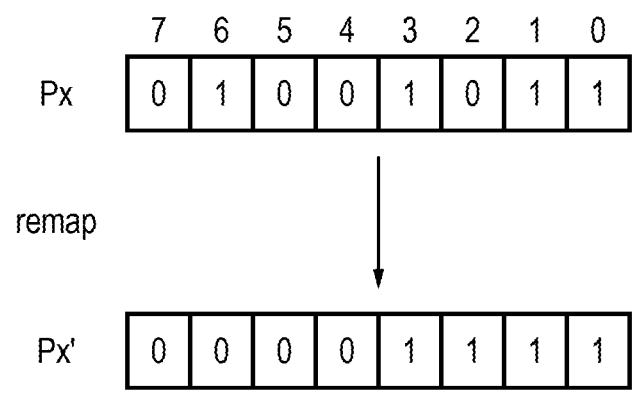
FIG. 8 shows an example of collapsing a predicate value to map non-adjacent active elements to adjacent element positions.

As shown in FIG. 8, another approach that could be taken at the decode stage 10 could be to coalesce non-adjacent active elements indicated by a predicate value so that they are mapped to adjacent positions, and also perform a corresponding mapping to change the positions of the input operands supplied to the processing hardware at the execute stage 16. For example, in FIG. 8 a predicate value specifies four active elements at element position 0, 1, 3 and 6, but by remapping these active elements to element position 0 to 3 this means that the upper half of the vectors will be entirely inactive. Power gating techniques may be more efficient at power gating a contiguous portion of the vector processing hardware corresponding to half of the register. Also, if the active elements of a given vector are mapped to a contiguous portion then this may free up a portion of the hardware for processing other operations in parallel as shown in FIG. 7. Hence, by remapping the positions of the active elements for the micro-operations sent to the execute stage 16 relative to their actual positions within the vector operands stored in the register file 14 this can enable more efficient processor utilisation. By considering this at the decode stage 10, this can allow the micro-operation composition to be varied to take advantage of these optimisations which would not otherwise be possible if the predicate was not checked until the execute stage.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
   instruction decoding circuitry to generate micro-operations in response to program instructions; and
   processing circuitry to perform data processing in response to the micro-operations generated by the instruction decoding circuitry; in which:
   in response to a predicated vector instruction specifying at least one vector operand and a predicate value, the instruction decoding circuitry is configured to generate at least one micro-operation to control the processing circuitry to perform a vector processing operation on the at least one vector operand to generate a result value, the predicate value specifying which of a plurality of data elements of each vector operand are active data elements, where the result value is dependent on the active data elements of said at least one vector operand; and
   in response to the predicated vector instruction, the instruction decoding circuitry is configured to read or predict an estimated value of the predicate value, and in at least one scenario when the estimated value of the predicate value specifies that two or more data elements are active data elements and one or more data elements are inactive data elements, to generate a remapped predicate value and at least one remapped predicated micro-operation corresponding to the remapped predicate value for which at least one of the active data elements is remapped to a remapped position different from an original position of the at least one active data element indicated by the estimated value;
   wherein the at least one remapped predicated micro-operation is to control the processing circuitry to execute the vector processing operation on the at least one of the active data elements indicated by the remapped predicate value.

2. The apparatus according to claim 1, in which the instruction decoding circuitry is configured to read said estimated value of the predicate value from a predicate register specified by the predicated vector instruction.

3. The apparatus according to claim 1, in which the instruction decoding circuitry is configured to predict said estimated value of the predicate value based on an actual value of said predicate value identified on a previous instance of processing said predicated vector instruction.

4. The apparatus according to claim 1, in which the instruction decoding circuitry is configured to vary a vector size specified for said at least one micro-operation depending on the estimated value of the predicate value.

5. The apparatus according to claim 1, in which when the estimated value of the predicate value indicates less than a threshold number or fraction of active data elements, the instruction decoding circuitry is configured to generate said at least one micro-operation specifying a smaller vector size for said vector processing operation than a vector size specified for said predicated vector instruction.

6. The apparatus according to claim 1, in which the instruction decoding circuitry is configured to vary how many micro-operations are generated in response to the predicated vector instruction depending on the estimated value of the predicate value.

7. The apparatus according to claim 1, in which the instruction decoding circuitry is configured to determine whether to fuse a plurality of predicated vector instructions to generate the at least one remapped predicated micro-operation for processing by the processing circuitry, depending on estimated values of the predicate value for each of said plurality of predicated vector instructions.

8. The apparatus according to claim 7, in which the instruction decoding circuitry is configured to determine whether to fuse said plurality of predicated vector instructions depending on a determination of whether a total data size of the active elements indicated by the estimated values of the predicate value for each of said plurality of predicated vector instructions is less than a maximum vector size supported by the processing circuitry.

9. The apparatus according to claim 1, in which when the estimated value of the predicate value indicates a plurality of active elements at non-adjacent element positions, the instruction decoding circuitry is configured to generate the at least one remapped predicated micro-operation for which portions of the at least one vector operand corresponding to the plurality of active elements are remapped to adjacent element positions.

10. The apparatus according to claim 9, in which the result value comprises a result vector comprising a plurality of data elements, and
when the instruction decoding circuitry generates said at least one remapped micro-operation, the processing circuitry is configured to write adjacent portions of the result vector generated by the processing circuitry in response to the at least one remapped micro-operation to non-adjacent portions of at least one result vector register, said non-adjacent portions selected depending on the predicate value.

11. The apparatus according to claim 1, in which in response to the predicated vector instruction, the instruction decoding circuitry is configured to generate the at least one remapped predicated micro-operation depending on the estimated value of the predicate value, when it is determined that there is no outstanding micro-operation capable of changing the predicate value for said predicated vector instruction before said at least one micro-operation corresponding to the predicated vector instruction is processed by the processing circuitry.

12. The apparatus according to claim 11, in which when there is at least one outstanding micro-operation capable of changing the predicate value for said predicated vector instruction before said at least one micro-operation corresponding to the predicated vector instruction is processed by the processing circuitry, the instruction decoding circuitry is configured to generate said at least one micro-operation with a fixed composition independent of the estimated value of the predicate value.

13. The apparatus according to claim 11, in which when there is at least one outstanding micro-operation capable of changing the predicate value for said predicated vector instruction before said at least one micro-operation corresponding to the predicated vector instruction is processed by the processing circuitry, the instruction decoding circuitry is configured to generate said at least one micro-operation with a same composition that would be generated when the estimated predicate value for said predicated vector instruction indicates that all data elements are active elements.

14. The apparatus according to claim 1, in which in response to said at least one micro-operation generated in response to said predicated vector instruction, the processing circuitry is configured to determine whether an actual value of the predicate value matches the estimated value determined by the instruction decoding circuitry, and to trigger a misprediction recovery action when a mismatch is detected between the actual value and the estimated value.

15. The apparatus according to claim 14, in which the misprediction recovery action comprises restoring architectural state associated with a previous processing point, and resuming processing from said previous processing point.

16. An apparatus comprising:
means for generating micro-operations in response to program instructions; and
means for performing data processing in response to the micro-operations generated by the means for generating; in which:
in response to a predicated vector instruction specifying at least one vector operand and a predicate value, the means for generating is configured to generate at least one micro-operation to control the means for performing data processing to perform a vector processing operation on the at least one vector operand to generate a result value, the predicate value specifying which of a plurality of data elements of each vector operand are active data elements, where the result value is dependent on the active data elements of said at least one vector operand; and
in response to the predicated vector instruction, the means for generating is configured to read or predict an estimated value of the predicate value, and in at least one scenario when the estimated value of the predicate value specifies that two or more data elements are active data elements and one or more data elements are inactive data elements, to generate a remapped predicate value and at least one remapped predicated micro-operation corresponding to the remapped predicate value for which at least one of the active data elements is remapped to a remapped position different from an original position of the at least one active data element indicated by the estimated value;
wherein the at least one remapped predicated micro-operation is to control the means for performing data processing to execute the vector processing operation on the at least one of the active data elements indicated by the remapped predicate value.

17. A data processing method comprising:
a decoding step of generating micro-operations in response to program instructions; and
a processing step of performing data processing in response to the micro-operations generated in the decoding step; in which:
the decoding step comprises, in response to a predicated vector instruction specifying at least one vector operand and a predicate value:
reading or predicting an estimated value of the predicate value; and
generating at least one micro-operation to control the processing step to perform a vector processing operation on the at least one vector operand to generate a result value, the predicate value specifying which of a plurality of data elements of each vector operand are active data elements, where the result value is dependent on the active data elements of said at least one vector operand, and a remapped predicate value and at least one remapped predicated micro-operation corresponding to the remapped predicate value are generated for which at least one of the active data elements is remapped to a remapped position different from an original position of the at least one active data element indicated by the estimated value in at least one scenario when the estimated value of the predicate value specifies that two or more data elements are active data elements and one or more data elements are inactive data elements;
wherein in response to the at least one remapped predicated micro-operation, the vector processing operation is performed on the at least one of the active data elements indicated by the remapped predicate value.

* * * * *